United States Patent [19]
Uchimura et al.

[11] Patent Number: 4,690,230
[45] Date of Patent: Sep. 1, 1987

[54] MULTI-RANGE LOAD CELL WEIGHING INSTRUMENT

[75] Inventors: Mitsuo Uchimura; Tsutomu Masuyama, both of Shizuoka, Japan

[73] Assignee: Tokyo Electric Co., Ltd., Tokyo, Japan

[21] Appl. No.: 850,044

[22] Filed: Apr. 10, 1986

[30] Foreign Application Priority Data

Apr. 25, 1985 [JP] Japan .................................. 60-89263

[51] Int. Cl.$^4$ .......................... G01G 3/08; G01G 3/14
[52] U.S. Cl. ..................................... 177/229; 177/211
[58] Field of Search ....................... 177/211, 229, 25.17

[56] References Cited
U.S. PATENT DOCUMENTS 4,037,675 7/1977 Storace ................................ 177/229

FOREIGN PATENT DOCUMENTS 55-63719 5/1980 Japan .
59-195131 11/1984 Japan .

Primary Examiner—George H. Miller, Jr.
Attorney, Agent, or Firm—Oblon, Fisher, Spivak, McClelland & Maier

[57] ABSTRACT

Means for supporting an article to be weighed, a low range load cell having a high accuracy weighing range and including means for outputting a first signal in response to a weight on the supporting means and a high range load cell having a high load weighing range which is higher than the high accuracy weighing range, the high range load cell including means for outputting a second signal in response to a weight on the supporting means, are provided. Means are also provided for receiving the first and second signals and for outputting a weight signal as a function of one of the first and second signals, the means for receiving including means for outputting the weight signal as a function of the first signal for any weight within the weighing range of the low range load cell, whereby high accuracy weighing is achieved. The instrument includes means for counting a number of weighings and for outputting a counting signal as a function of the first and second signals received as a result of repeated weighings, whereby the instrument can be used as a counting instrument. The weight can be displayed in either pound or kilogram units, with a preferences given for kilogram units.

6 Claims, 4 Drawing Figures

MULTI-RANGE LOAD CELL WEIGHING INSTRUMENT

BACKGROUND OF THE INVENTION

1. Field of the Invention

This invention relates to a multi-range load cell weighing instrument which can weigh a wide range of loads with high accuracy using a plurality of load cells having different weighing ranges and different minimum measuring units.

2. Discussion of the Related Art

Weighing instruments which can weigh a wide range of loads using a plurality of load cells having different weighing ranges and different minimum measuring units are already known, and one of such weighing instruments is disclosed, for example, in U.S. Pat. No. 4,037,675. The weighing instrument disclosed includes a low range load cell and a high range load cell which are arranged in serial relationship to a pan so that a measured value may be obtained from data of either one of the load cells. However, there is no distinct criterion for determination of data at or near a boundary between weighing ranges of the low and high range load cells, and actually, data is taken in arbitrarily either from the low range load cell or the high range load cell. As a result, there is no stability in measurement.

SUMMARY OF THE INVENTION

It is a first object of the present invention to provide a multi-range load cell weighing instrument wherein a measured value is determined with reference to a weighed value within a high accuracy weighing range of a low range load cell.

It is a second object of the invention to provide a multi-range load cell weighing instrument which can be used also as a counting instrument.

It is a third object of the invention to provide a multi-range load cell weighing instrument which has a function as a weighing instrument and another function as a counting instrument which can be changed over simply by operation of a change-over key.

According to the invention, a multi-range load cell weighing instrument comprises means for supporting an article to be weighed, a low range load cell having a high accuracy weighing range and including means for outputting a first signal in response to a weight on the supporting means, a high range load cell having a high load weighing range which is higher than the high accuracy weighing range, the high range load cell including means for outputting a second signal in response to a weight on the supporting means. Means are also provided for receiving the first and second signals and for outputting a weight signal as a function of one of the first and second signals, the means for receiving including means for outputting the weight signal as a function of the first signal for any weight within the weighing range of the low range load cell, whereby high accuracy weighing is achieved.

The instrument includes means for counting a number of weighings and for outputting a counting signal as a function of the first and second signals received as a result of repeated weighings, whereby the instrument can be used as a counting instrument. The weight can be displayed in either pound or kilogram units, with a preferences given for kilogram units.

BRIEF DESCRIPTION OF THE DRAWINGS

Various other objects, features and attendant advantages of the present invention will be more fully appreciated as the same becomes better understood from the following detailed description when considered in connection with the accompanying darwings in which like reference characters designate like or corresponding parts throughout the several views and wherein.

DETAILED DESCRIPTION OF THE PREFERRED EMBODIMENTS

Figure 2:
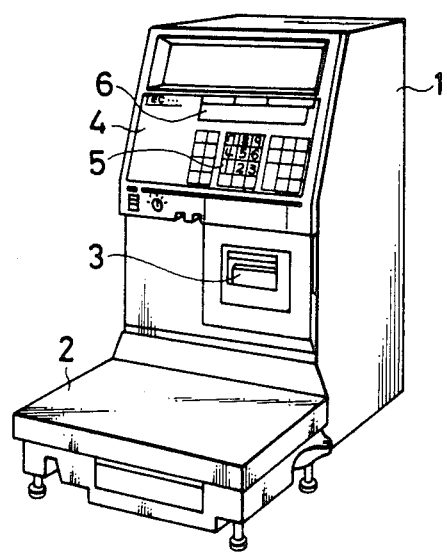
FIG. 2 is a perspective view of an overall electronic charging instrument.

An embodiment of the present invention will be described with reference to the accompanying drawings. Referring first to FIG. 2 which shows an overall appearance of an electronic charging instrument, the electronic charging instrument generally denoted at 1 includes a weighing section 2 for measuring a weight of an article and has a label printer built therein. The electronic charging instrument 1 has a label issuing opening 3 formed therein for issuing a label printed by the label printer. An operation panel 4 is provided at an upper part of the electronic charging instrument 1 and has various keys and switches such as ten keys 5 and a display 6 for indicating a weight, a unit price and a price thereon.

Figure 1:
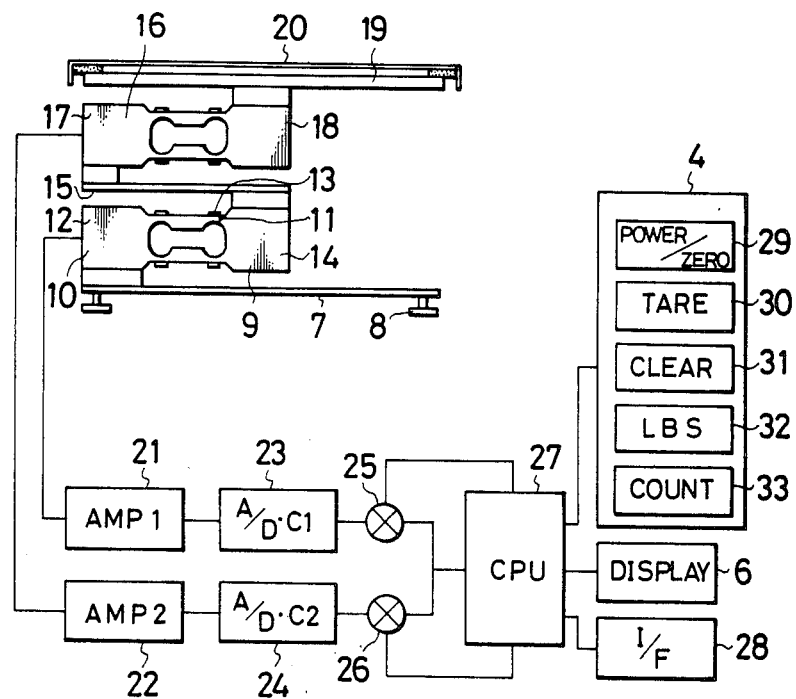
FIG. 1 is a vertical sectional side elevational view, partly shown in the form of a block diagram, illustrating a multi-range load cell weighing instrument according to an embodiment of the present invention.

Here, the weighing section 2 is constituted as a multi-range load cell weighing instrument as illustrated in FIG. 1. Referring to FIG. 1, the multi-range load cell weighing instrument includes a base 7 made of a plate material having a high strength, and a plurality of legs 8 mounted under the base 7 by means of which the weighing instrument is placed on a floor. A high range load cell 9 is mounted on a widthwise center line on the base 7 with a securing portion 10 of the cell 9 secured to the base 7. While detailed description of the structure of the high range load cell 9 is omitted herein, the load cell 9 includes a load cell body 12 of a parallelogram shape having four deformable thin wall portions 11 and has strain gauges 13 adhered to the deformable thin wall portions 11 of the load cell body 12. An upper base 15 is secured to a load receiving portion 14 of the high range load cell 9, and a securing portion 17 of a low range load cell 16 is secured to the other end of the upper base 15. The low range load cell 16 has a similar structure to that of the high range load cell 9. Here, the high range load cell 9 and the low range load cell 16 are located on the widthwise center line of the base 7. A tray frame 19 is mounted on a load receiving portion 18 of the low range load cell 16 mounted in this manner, and a tray 20 is placed on the tray frame 19. The center of the tray 20 coincides with the center of the base 7. A central processing unit (CPU) 27 is electrically connected to the high and low range load cells 9 and 16 by way of a pair of amplifiers 21 and 22, analog to digital converters 23 and 24, and switches 25 and 26, respectively. The CPU 27 acts to alternatively turn the switches 25 and 26 on and is also connected to the display 6 and an interface 28 for external connection.

Various keys provided on the operation panel 4 such as a POWER/ZERO key 29, a packing subtracting key 30, a clear key 31, a pound LBS key 32 and a count key 33, are also connected to the CPU 27.

Basic weighing operation of the weighing section 2 as a multi-range load cell weighing instrument having the construction as described above will now be described. Basically, an article to be weighed is placed on the tray 20 in order to measure the weight of the article, and the high range load cell 9 and the low range load cell 16 are alternatively used in accordance with the weight of the load. In particular, the low range load cell has a high accuracy weighing range characteristic wherein an accurate weighed value can be obtained when the load is low while the high range load cell 9 has a high load range characteristic wherein an accurate weighed value can be obtained when the load is high. Accordingly, one of the load cells 9 or 16 is selectively used in accordance with the weight of the load. During such a weighing operation, as the load is applied to the tray 20, the low range load cell 16 and the high range load cell 9 are both deformed so that electric signals are outputted independently therefrom. The two electric signals are amplified by the amplifiers 21 and 22, and then the two analog electric signals are converted into digital signals by the analog to digital converters 23 and 24, respectively, and delivered to the CPU 27. Here, based on information within the CPU 27, it is determined which one of the signals from the high range load cell 9 and the low range load cell 16 is to be adopted in accordance with the load then applied, and one of the switches 25 and 26 is selected depending upon such determination. Then, results of the weighing measurement are indicated in a weight indicating section of the display 6. Such an indication on the display 6 is given in a suitable column which is automatically determined in accordance with the magnitude of the load depending upon information stored in the CPU 27.

Figure 3:
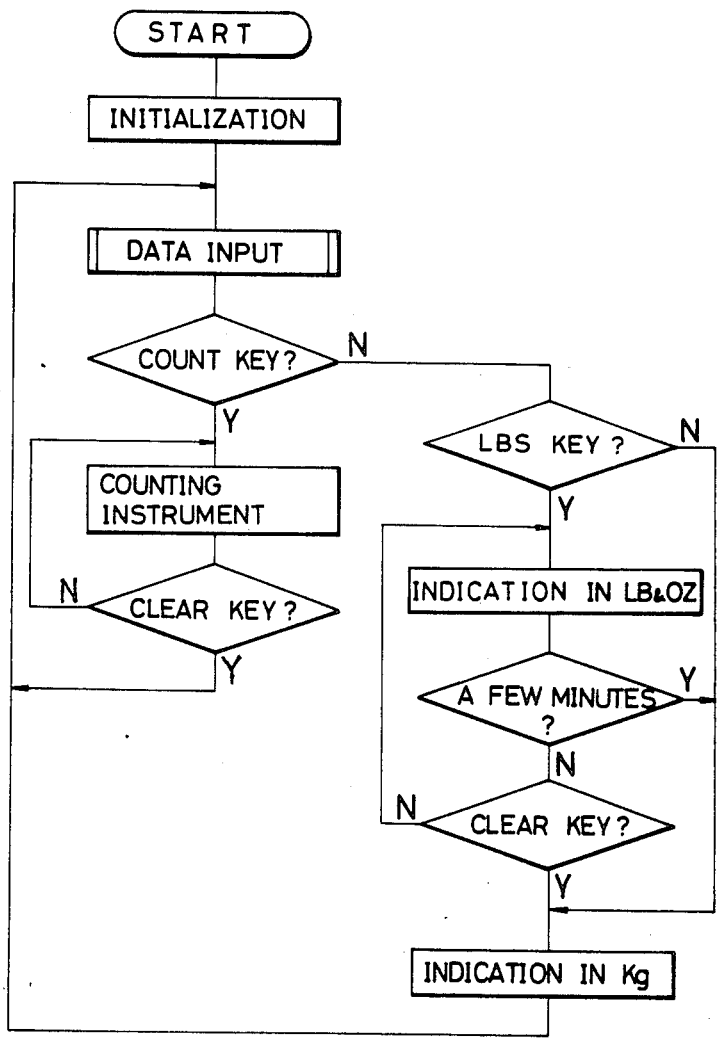
FIG. 3 is a flow chart illustrating general operation of the electronic charging instrument of FIG. 2.

Now, functions of the present embodiment having the construction as described above will be generally described with reference to a flow chart of FIG. 3. At first, the system is initialized including checking of display segments, setting of the zero point which makes a reference for measurement and packing subtraction, and then an article or object of measurement is weighed and such data are inputted. In an ordinary case, the count key 33 and the pound LBS key 32 are not depressed, and hence results of weighing measurement are indicated in kg units. In this case, a wide range of weighing measurement from a light-weight article to a heavy article can be effected with a high accuracy.

Meanwhile, the present embodiment will allow operation as a counting instrument if the count key 33 is depressed in such a measuring operation. Operation of the apparatus as a counting instrument will be hereinafter described. Thus, since a function as a counting instrument is provided using a multi-range load cell weighing instrument having a wide range of weighing functions with high accuracy as described above, the multi-range load cell weighing instrument can be used as an inexpensive, highly reliable counting instrument which can be produced in mass and can weigh over a wide range with high accuracy.

Meanwhile, in use of the apparatus as a weighing instrument as described above, if the pound LBS key 32 is depressed, the weight measured can be indicated in pound (LB) units or ounce (OZ) units. This is an improvement over a conventional weighing instrument which can indicate a weight only in units of either kg or pound as originally designed. In other words, according to a conventional instrument, if a value indicated in kg units is to be indicated in pound or ounce units, a converting calculation must necessarily be done. On the contrary, according to the present embodiment, results of measurement can be indicated in a desired unit or either kg or pounds. Here, indication in ounces will be done in multiple ranges such as, for example, listed below:

0–5 LB→one graduation 0.05 OZ
5–20 LB→one graduation 0.2 OZ
beyond 20 LB→one graduation 0.5 OZ.

By the way, as a unit of weight, the units of kg are being employed on a worldwide scale while employment of the units of pounds and ounces is decreasing. In consideration of the tendency, in the present embodiment, results of measurements are basically indicated in kg units, and only when the pound LBS key 32 is depressed is indication in pound or ounce units allowed, but such indication is effected only temporarily, for example, for several seconds, and after lapse of the time, indication in kg is automatically restored. However, because an operator may sometimes want to see an indication in kg followed by an indication in pound or ounce units, according to the present embodiment, an indication in kg can be restored instantaneously by depressing the clear key 31 before the delay time of several seconds passes.

It is to be noted that, upon indication in the units of pounds or ounces, conversion of data for indication in the units of kg at that point of time into data in the units of pounds or ounces is not involved, and data for indication of weight in the unit of pound or ounce are changed in response to a change in weight during weighing measurement.

Now, an example of operational procedure for each of various operations will be described.

A.

OPERATION AS A WEIGHING INSTRUMENT

A-1: Normal Operation

| Step | Indication | Lamp, LED | Others |
|---|---|---|---|
| (1) | 8888.888 (blank) | kg | Segment Check |
| (2) | 0.000 | kg zero | |
| (3) | 0.893 | kg | |
| (4) | 0.000 | kg zero | |

At first at step 1, the POWER/ZERO key 29 is depressed. As a result, display segments of the display 6 are checked by flickering of numerals 8 and 0, and then at step 2, an initial indicating condition indicating 0.000 is entered. In this condition, weighing measurement is possible, and if an article or object to be weighed is placed on the tray 20 at step 3, the weight of the article is indicated in the unit of kg, such as, for example 0.893 kg. Then, if the article is removed from the tray 20 at step 4, the initial condition indicating 0.000 is restored. The criterion for the zero indication output is determined depending upon a measured value of the low range load cell 16 of high accuracy, and hence high accuracy for an instrument is assured. Accordingly, when a measured value of the high range load cell 9 is to be used, the values of the high range load cell 9 and the low range load cell 16 are compared with each other to convert the measured value of the high range load cell 9 for indication thereof.

Figure 4:
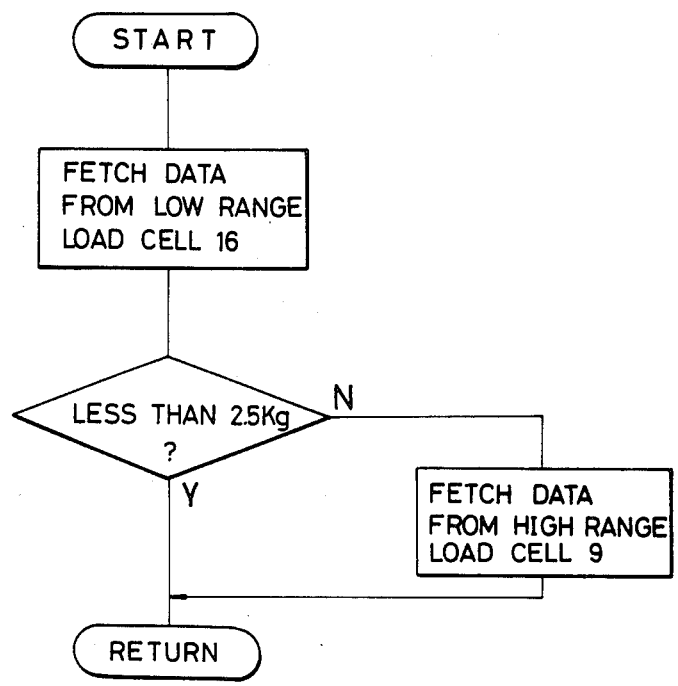
FIG. 4 is a flow chart illustrating a data input sequence included in the routine of FIG. 3.

This operation is included in a step of "DATA INPUT" in FIG. 3, and contents thereof will now be described with reference to FIG. 4. At first, data is taken in from the low range load cell 16 and it is determined if it is lower than 2.5 kg or not. If it is equal to or lower than 2.5 kg, the data from the low range load cell 16 is adopted, but on the contrary if it is higher than 2.5 kg, data of the high range load cell 9 is adopted. In this manner, a high accuracy weighing range of the high range load cell 9 is considered a reference or criterion. Accordingly, at or near a boundary between the high accuracy weighing range of the low range load cell 16 and a high load weighing range of the high range load cell 9, the criterion for data is at the high accuracy weighing range of the low range load cell 16, and hence stabilized data processing is assured.

A-2: Zero Setting

| Step | Indication | Lamp, LED |
|------|------------|-----------|
| (5)  | 0.001      | kg        |
| (6)  | Going off  | Going off |
| (7)  | 8888.893 (blank) | kg  |
| (8)  | 0.000      | kg zero   |

When the indication at the initialized condition is not zero as indicated at step 5, the POWER/ZERO key 29 will be depressed at step 6 so that processing and indication of Going off may be effected to effect a zero setting operation. After completion of the zero setting operation, the POWER/ZERO key 29 will be depressed at step 7. As a result, after checking of the display segments, an initialized condition as shown at step 8 is reached to allow subsequent weighing measurement.

A-3: Packing Subtraction

| Step | Indication | Lamp, LED |
|------|------------|-----------|
| (9)  | 0.000      | kg zero   |
| (10) | 0.456      | kg        |
| (11) | 0.000      | kg net    |
| (12) | −0.456     | kg zero net |
| (13) | 1.500      | kg net    |
| (14) | 0.000      | kg zero   |

At first at step 9, an initialized condition is shown. Then at step 10, if a vessel is placed on the tray 20, the weight of the vessel is indicated as 0.456 kg. Then, if the packing subtraction key 30 is depressed at step 11, the indication changes to 0.000 and the weight of the vessel is stored in memory while a net indication that the weight indication is to be net is effected. Then if the vessel is removed from the tray 20 at step 12, the weight of the vessel is subtracted and a negative indication of −0.456 appears. This allows net weighing measurement, and zero and net indications are added. Here, if at step 13 an article to be weighed is placed on the tray 20 together with the vessel, the weight of the article itself less that of the vessel is indicated as 1.500 kg. After then, if the article and the vessel are all removed from the tray 20 at step 14, the initial condition is restored.

A-4: Indication in Pound and Ounce

| Step | Indication | Lamp, LED |
|------|------------|-----------|
| (15) | 0.000      | kg zero   |
| (16) | 4.535      | kg        |
| (17) | 10  0.0    | lbs oz    |
| (18) | 4.535      | kg        |

Step 15 indicates an initialized condition wherein weighing measurement is possible as in the normal operation as described above. If an article to be weighed is placed on the tray 20 at step 16, the weight of the article is indicated in units of kg as 4.535 kg. Here, if the pound LBS key 32 is depressed at step 17, the unit of the indication is changed to lbs (pound) and oz (ounce), and an indication of 10 0.0 appears on the display 6, indicating that the weight of the article is 10 pounds (0 ounce). Step 18 indicates that the indication in the units of kg is restored either after a lapse of several seconds or in response to depression of the clear key 31.

B.

OPERATION AS A COUNTING INSTRUMENT

B-1: Packing Subtraction

| Step | Indication | Lamp, LED | Others |
|------|------------|-----------|--------|
| (19) | 0.000      | kg zero   |        |
| (20) | 10         | COUNT zero | 10 Flickering |
| (21) | 10         | COUNT     | 10 Flickering |
| (22) | 10         | COUNT net | 10 Flickering |

Step 19 represents that the apparatus is in an initialized condition as a weighing instrument. Thus, if the count key 33 is depressed at step 20 in order to change over the apparatus to a counting instrument, an initial indicating condition as a counting instrument appears wherein digits 1 and 0, that is, a numeral 10, is indicated in a flickering condition while COUNT and zero are also indicated. Then, if a vessel is placed on the tray 20 at step 21, the zero indication disappears and the weight of the vessel is measured. Then, if the packing subtracting key 30 is depressed at step 22, net indication appears, which represents that a counting indication is thereafter less that of a packing.

B-2: Automatic Counting

| Step | Indication | Lamp, LED | Others |
|------|------------|-----------|--------|
| (23) | 0.000      | kg zero   |        |
| (24) | 10         | COUNT zero | 10 Flickering |
| (25) | 10         | COUNT     | 10 Flickering |
| (26) | 25  10     | COUNT     | 25 Flickering |
| (27) | 25  25     | COUNT     |        |
| (28) | 25         | COUNT     |        |
| (29) | 1248       | COUNT     |        |
| (30) | 0          | COUNT zero |        |
| (31) | 1013       | COUNT     |        |

Step 23 represents that the apparatus is in an initialized condition as a weighing instrument. Here, if the count key 33 is depressed at step 24, an initial indicating condition is entered wherein digits 10 are indicated in a flickering condition while COUNT and zero are also indicated. Here, the numeral 10 on the display 6 indicates that up to 10 articles to be weighed are to be placed on the tray 20. Here at step 25, if 10 articles are placed on the tray 20, then the zero indication disappears while the instrument divides by 10 the total weight of the 10 sample articles placed on the tray 20 to calculate the weight of a single sample and then rounds and multiplies by 10 a value obtained by the division whereafter a value obtained by the multiplication by 10 is compared with the measured weight value obtained by the instrument. If results of the comparison prove a sufficiently small difference therebetween, there is no problem, but on the contrary if the difference between the values is large, a large counting error can be forecast. Accordingly, in order to eliminate this, it is required to use a greater number of samples to determine the weight of a single sample article. To indicate this requirement, flickering indication of the numeral 10 is continued. Thus, the count key 33 will be depressed again at step 26. As a result, at step 26, an indication of digits 2 and 5, that is, a numeral 25, flickers together with the numeral 10, thereby indicating that sample articles are to be additionally placed on the tray 20 until the total number 25 is reached. Then, in accordance with the instruction, sample articles will be placed on the tray 20 at step 27 until the total number 25 is reached. In this condition with the 25 articles placed on the tray 20, the measured value is compared in a similar manner with a value which is calculated from the total weight of the 25 sample articles and then rounded and multiplied by 25. Here, if a difference between the two values is sufficiently small, the flickering indication of the numeral 25 disappears as seen from step 28, and the weight of a single sample article is stored in memory to allow a subsequent counting operation. Also in this case, if such a difference is large, another numeral such as, for example, 50, is indicated in a flickering condition in order that the weight of a single sample article may be calculated from a further greater number of sample articles. After a count allowing condition has been entered, an arbitrary number of articles which are similar to the sample articles are placed on the tray 20. In this instance, since the weight of a single article is already calculated and stored in memory, if a measured weight is divided by the weight of a single article, the number of the articles placed on the tray 20 is calculated and indicated, for example, like 1248. Here, since the weight of a single article has been already calculated with high accuracy using a multi-range load cell, upon counting operation as a counting instrument, accuracy in such counting is high with a small error. Besides, if a large number of articles are placed on the instrument, since weighing over a wide range by the high range load cell 9 can be effected, counting of such a large number is allowed, resulting in counting over a wide range. Then, if the articles are removed from the tray 20 at step 30, the zero indication is restored. After then, at step 31, a suitable number of the same articles are placed on the tray 20 for counting thereof, and in the case listed, results of the counting are 1013.

B-3: In the Case Where the Weight of 10 Sample Articles Is Equal to or Less than 6 g.

| Step | Indication | Lamp, LED | Others |
| --- | --- | --- | --- |
| (32) | 0.000 | kg zero | |
| (33) | 10 | COUNT zero | 10 Flickering |
| (34) | 10 | COUNT | 10 Flickering |
| (35) | 10 | COUNT Sample low Error | |
| (36) | 10 | COUNT | 10 Flickering |
| (37) | 0.005 | kg | |

Steps 32 to 34 are similar to those as described above. Here at step 34, since the total weight of 10 sample articles is equal to or less than 6 g which is a weight less than a minimum weighing capacity of the instrument of the present embodiment, the numeral 10 still continues to be indicated in a flickering condition, indicating that the weight of a single sample article is not yet calculated. Here, if the count key 33 is depressed again at step 35 in a similar manner to that as described above, the flickering indication of the numeral 10 disappears, but in this case another indication of Sample Low Error appears, which represents that the sample articles are too light. Thus, if the clear key 31 is depressed at step 36, a numeral 10 is indicated in a flickering condition, and then if the clear key 31 is depressed again at step 37, the indication of the units is changed to kg and the total weight of the 10 sample articles which is below 6 g is indicated, for example, as 0.005 kg.

It is to be noted that when the present invention is put into practice, positions of the low range load cell 16 and the high range load cell 9 may be exchanged or otherwise they may be arranged on a straight line. Besides, the number of load cells is not limited to two, and three or more load cells having different weighing ranges may be used.

Obviously, numerous modifications and variations of the present invention are possible in light of the above teachings. It is therefore to be understood that within the scope of the appended claims, the invention may be practiced otherwise than as specifically described herein.

We claim:

1. A multi-range load cell weighing instrument comprising:
   means for supporting an article to be weighed;
   a low range load cell having a high accuracy weighing range and including means for outputting a first signal in response to a weight on said supporting means;
   a high range load cell having a high load weighing range which is higher than said high accuracy weighing range, said high range load cell including means for outputting a second signal in response to a weight on said supporting means;
   means for receiving said first and second signals and for outputting a weight signal as a function of one of said first and second signals, wherein said means for receiving includes means for outputting said weight signal as a function of said first signal for any said weight within said weighing range of said low range load cell, whereby high accuracy weighing is achieved;
   means for counting a number of repetitions of receiving said first and second signals by said means for receiving; and means for outputting a counting signal as a function of said received repetition signals, whereby said instrument may be used as a counting instrument.

2. The instrument of claim 1 including means for determining when said weight is within said weighing range of said low range load cell.

3. An instrument according to claim 1 wherein for operation of said multi-range load cell weighing instrument as a counting instrument, there are provided:
  means for determining a total weight of a fixed number of samples,
  means for dividing said total wight by said fixed number;
  means for rounding an output of said dividing means;
  means for multiplying an output of said rounding means by said fixed number to determine a counted value;
  means for comparing said counted value with said total weight and computing a difference therebetween;
  means for dividing said total weight by said fixed number when said difference is within a predetermined range; and
  means for increasing said fixed number and repeating the above steps when said difference is outside of said predetermined range.

4. The instrument of claim 1 including a change over means for changing over between use of said instrument as a weighing instrument and as a counting instrument.

5. The instrument of claim 1 including means for selectively displaying said weight in units of one of pounds and kilograms.

6. The instrument of claim 5 including means for preferably displaying said weight in units of kilograms.

* * * * *